(12) United States Patent
Kirby et al.

(10) Patent No.: US 11,072,566 B2
(45) Date of Patent: Jul. 27, 2021

(54) THERMAL AND ENVIRONMENTAL BARRIER COATING COMPOSITIONS AND METHODS OF DEPOSITION

(71) Applicant: General Electric Company, Schenectady, NY (US)

(72) Inventors: Glen Harold Kirby, Niskayuna, NY (US); Thomas Grandfield Howell, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 16/543,836

(22) Filed: Aug. 19, 2019

(65) Prior Publication Data

US 2019/0367423 A1 Dec. 5, 2019

Related U.S. Application Data

(63) Continuation of application No. 15/322,837, filed as application No. PCT/US2015/033646 on Jan. 2, 2015, now Pat. No. 10,421,692.

(Continued)

(51) Int. Cl.
*C01B 33/10* (2006.01)
*C01G 39/00* (2006.01)
(Continued)

(52) U.S. Cl.
CPC .......... *C04B 41/009* (2013.01); *C01B 33/20* (2013.01); *C01G 39/006* (2013.01);
(Continued)

(58) Field of Classification Search
CPC .............. C04B 41/009; C04B 41/5024; C04B 41/5027; C04B 41/5059; C04B 41/5066;
(Continued)

(56) References Cited

U.S. PATENT DOCUMENTS

| 8,658,255 B2 | 2/2014 | Kirby et al. |
| 9,005,716 B2 | 4/2015 | Kirby et al. |

(Continued)

FOREIGN PATENT DOCUMENTS

| EP | 2284140 A2 | 2/2011 |
| JP | 2007-012508 A * | 1/2007 |

(Continued)

OTHER PUBLICATIONS

Han, X.M., et al. "(Sol-gel deposition and luminescence properties of lanthanide ion-doped Y2(1−x)Gd2xSiWO8 (0 ≤ x ≤ 1) phosphor films." Applied Physics A, vol. 80, No. 7, 2004, pp. 1547-1552., DOI:10.1007/s00339-004-2506-4. (Year: 2004).*

(Continued)

*Primary Examiner* — Daniel J. Schleis
*Assistant Examiner* — Kevin Ct Li
(74) *Attorney, Agent, or Firm* — Dority & Manning, P.A.

(57) ABSTRACT

A coated substrate is provided that comprises: a substrate; and a barrier coating comprising a compound having the formula: $Ln_2ABO_8$, where Ln comprises scandium, yttrium, lanthanum, cerium, praseodymium, neodymium, promethium, samarium, europium, gadolinium, terbium, dysprosium, holmium, erbium, thulium, ytterbium, lutetium, or mixtures thereof; A comprises Si, Ti, Ge, Sn, Ce, Hf, Zr, or a combination thereof; and B comprises Mo, W, or a combination thereof. In one embodiment, B comprises Mo. A gas turbine is also provided that comprises the coated substrate described above.

15 Claims, 7 Drawing Sheets

Related U.S. Application Data

(60) Provisional application No. 62/069,346, filed on Oct. 28, 2014, provisional application No. 62/018,983, filed on Jun. 30, 2014.

(51) Int. Cl.

| | |
|---|---|
| *C01G 41/00* | (2006.01) |
| *C04B 41/50* | (2006.01) |
| *C04B 41/52* | (2006.01) |
| *C04B 41/87* | (2006.01) |
| *F01D 25/00* | (2006.01) |
| *F01D 5/28* | (2006.01) |
| *C04B 41/00* | (2006.01) |
| *C04B 41/89* | (2006.01) |
| *C01B 33/20* | (2006.01) |

(52) U.S. Cl.
CPC ........ *C01G 41/006* (2013.01); *C04B 41/5024* (2013.01); *C04B 41/5027* (2013.01); *C04B 41/5059* (2013.01); *C04B 41/5066* (2013.01); *C04B 41/5071* (2013.01); *C04B 41/5096* (2013.01); *C04B 41/52* (2013.01); *C04B 41/522* (2013.01); *C04B 41/87* (2013.01); *C04B 41/89* (2013.01); *F01D 5/288* (2013.01); *F01D 25/005* (2013.01); *F05D 2230/90* (2013.01); *F05D 2300/13* (2013.01); *F05D 2300/15* (2013.01); *F05D 2300/21* (2013.01); *F05D 2300/6033* (2013.01); *F05D 2300/611* (2013.01)

(58) Field of Classification Search
CPC . C04B 41/5071; C04B 41/5096; C04B 41/52; C04B 41/522; C04B 41/87; C04B 41/89; C01B 33/20; F01D 5/288; F01D 5/005; F05D 2230/90; F05D 2230/13; F05D 2230/15; F05D 2230/21; F05D 2230/6033; F05D 2230/611; F05D 5/288; F05D 25/005
See application file for complete search history.

(56) References Cited

U.S. PATENT DOCUMENTS

| | | | |
|---|---|---|---|
| 2006/0280952 A1* | 12/2006 | Hazel | C04B 41/52 428/446 |
| 2010/0129636 A1 | 5/2010 | Cybulsky et al. | |
| 2010/0159151 A1 | 6/2010 | Kirby et al. | |
| 2012/0244383 A1 | 9/2012 | Meschter et al. | |
| 2013/0089673 A1 | 4/2013 | Kirby et al. | |
| 2013/0089720 A1 | 4/2013 | Kirby et al. | |
| 2013/0189531 A1* | 7/2013 | Lee | C04B 41/009 428/448 |

FOREIGN PATENT DOCUMENTS

| | | | |
|---|---|---|---|
| JP | 2007/012508 A | | 1/2007 |
| JP | 2011/032164 A | | 2/2011 |
| JP | 2011-063452 A | * | 3/2011 |
| JP | 2011/063452 A | | 3/2011 |
| JP | 2012/512966 A | | 6/2012 |
| JP | 2012/254914 A | | 12/2012 |
| JP | 2014-213272 A | * | 11/2014 |
| JP | 2014/213272 A | | 11/2014 |

OTHER PUBLICATIONS

Evans, A.G., et al. "Mechanisms Controlling the Durability of Thermal Barrier Coatings." Progress in Materials Science, vol. 46, No. 5, 2001, pp. 505-553., DOI:10.1016/s0079-6425(00)00020-7. (Year: 2001).*

Machine Translated Chinese Search Report Corresponding to Application No. 2016574377 dated Sep. 20, 2018.

First Chinese Office Action Corresponding to CN2015800359873 dated Jan. 23, 2019.

Japanese Notification of Reasons for Refusal Corresponding to JP2016574377 dated Oct. 9, 2018.

PCT Search Report Corresponding to PCT/US2015/033646 dated Nov. 18, 2015.

Han et al., Sol—Gel Deposition and Luminescence Properties of Lanthanide Ion-Doped $Y_2$ $(1-x)$ $Gd_{2x}SiWO_8$ $(0 \leq x \leq 1)$ Phosphor Films, Applied Physics A: Materials Science & Processing, vol. 80, Issue 7, Apr. 2005, pp. 1547-1552. (Abstract Only).

* cited by examiner

THERMAL AND ENVIRONMENTAL BARRIER COATING COMPOSITIONS AND METHODS OF DEPOSITION

PRIORITY INFORMATION

The present application is a continuation application, and claims priority to, U.S. patent application Ser. No. 15/322,837 filed on Dec. 29, 2016, which is a national stage application under 35 U.S.C. § 371(c) of prior filed PCT application serial number PCT/US15/033646, filed on 2 Jan. 2015, which claims priority to U.S. Provisional Patent Application Ser. No. 62/018,983 titled "Thermal and Environmental Barrier Coating Compositions and Methods of Deposition" of Kirby, et al. filed on Jun. 30, 2014, and to U.S. Provisional Patent Application Ser. No. 62/069,346 titled "Thermal And Environmental Barrier Coating Compositions And Methods Of Deposition" of Kirby, et al. filed on 28 Oct. 2014. The disclosures of the above-referenced priority applications are incorporated by reference herein.

TECHNICAL FIELD

Embodiments of the present invention generally relate to thermal and environmental barrier coatings for ceramic components and/or metallic components, along with methods of making the same.

BACKGROUND

Higher operating temperatures for gas turbine engines are continuously being sought in order to improve their efficiency. However, as operating temperatures increase, the high temperature durability of the components of the engine must correspondingly increase. Significant advances in high temperature capabilities have been achieved through the formulation of iron, nickel, and cobalt-based superalloys. Still, with many hot gas path components constructed from superalloys, thermal barrier coatings (TBCs) can be utilized to insulate the components and can sustain an appreciable temperature difference between the load-bearing alloys and the coating surface, thus limiting the thermal exposure of the structural component.

While superalloys have found wide use for components used throughout gas turbine engines, and especially in the higher temperature sections, alternative lighter-weight substrate materials have been proposed, such as ceramic matrix composite (CMC) materials. CMC and monolithic ceramic components can be coated with environmental barrier coatings (EBCs) to protect them from the harsh environment of high temperature engine sections. EBCs can provide a dense, hermetic seal against the corrosive gases in the hot combustion environment. In dry, high temperature environments, silicon-based (nonoxide) CMCs and monolithic ceramics undergo oxidation to form a protective silicon oxide scale. However, the silicon oxide reacts rapidly with high temperature steam, such as found in gas turbine engines, to form volatile silicon species. This oxidation/volatilization process can result in significant material loss, or recession, over the lifetime of an engine component. This recession also occurs in CMC and monolithic ceramic components comprising aluminum oxide, as aluminum oxide reacts with high temperature steam to form volatile aluminum species as well.

Currently, most EBCs used for CMC and monolithic ceramic components consist of a three-layer coating system generally including a bond coat layer, at least one transition layer applied to the bond coat layer, and an optional outer layer applied to the transition layer. Optionally, a silica layer may be present between the bond coat layer and the adjacent transition layer. Together these layers can provide environmental protection for the CMC or monolithic ceramic component.

More specifically, the bond coat layer may comprise silicon and may generally have a thickness of from about 0.5 mils (about 12.7 µm) to about 6 mils (about 152 µm). For silicon-based nonoxide CMCs and monolithic ceramics, the bond coat layer serves as an oxidation barrier to prevent oxidation of the substrate. The silica layer may be applied to the bond coat layer, or alternately, may be formed naturally or intentionally on the bond coat layer. The transition layer may typically comprise mullite, barium strontium aluminosilicate (BSAS), and various combinations thereof, while the optional outer layer may comprise BSAS. There may be from 1 to 3 transition layers present, each layer having a thickness of from about 0.1 mils (about 2.5 µm) to about 6 mils (about 152 µm), and the optional outer layer may have a thickness of from about 0.1 mils (about 2.5 µm) to about 40 mils (about 1 mm).

Each of the transition and outer layers can have differing porosity. At a porosity of about 10% or less, the layer is a hermetic seal to the hot gases in the combustion environment. From about 10% to about 40% porosity, the layer can display mechanical integrity, but hot gases can penetrate through the coating layer damaging the underlying EBC. While it is necessary for at least one of the transition layer or outer layer to be hermetic, it can be beneficial to have some layers of higher porosity range to mitigate mechanical stress induced by any thermal expansion mismatch between the coating materials and the substrate.

Unfortunately, deposits of calcium-magnesium-aluminosilicate (CMAS) have been observed to form on components located within higher temperature sections of gas turbine engines, particularly in combustor and turbine sections. These CMAS deposits have been shown to have a detrimental effect on the life of thermal barrier coatings, and it is known that BSAS and CMAS chemically interact at high temperatures, i.e. above the melting point of CMAS (approximately 1150° C. to 1650° C.). It is also known that the reaction byproducts formed by the interaction of BSAS and CMAS can be detrimental to EBCs, as well as susceptible to volatilization in the presence of steam at high temperatures. Such volatilization can result in the loss of coating material and protection for the underlying component. Thus, it is expected that the presence of CMAS will interact with the EBC, thereby jeopardizing the performance of the component along with component life. Accordingly, there remains a need for methods for making EBCs and ceramic components that is CMAS resistant and recession resistant.

BRIEF DESCRIPTION

Aspects and advantages of embodiments of the invention will be set forth in part in the following description, or may be obvious from the description, or may be learned through practice of embodiments of the invention.

A coated substrate is generally provided that comprises: a substrate; and a barrier coating comprising a compound having the formula: $Ln_2ABO_8$, where Ln comprises scandium, yttrium, lanthanum, cerium, praseodymium, neodymium, promethium, samarium, europium, gadolinium, terbium, dysprosium, holmium, erbium, thulium, ytterbium, lutetium, or mixtures thereof; A comprises Si, Ti, Ge, Sn, Ce, Hf, Zr, or a combination thereof and B comprises Mo, W, or a combination thereof. In one embodiment, B comprises Mo.

A gas turbine is also generally provided that comprises the coated substrate described above. In one embodiment, the coated substrate defines a turbine component positioned within a hot gas flow path of the gas turbine such that the coating forms a barrier coating on the component to protect the component within the gas turbine when exposed to the hot gas flow path.

These and other features, aspects and advantages of embodiments of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The subject matter which is regarded as the invention is particularly pointed out and distinctly claimed in the concluding part of the specification. Embodiments of the invention, however, may be best understood by reference to the following description taken in conjunction with the accompanying drawing figures in which:

Figure 1:
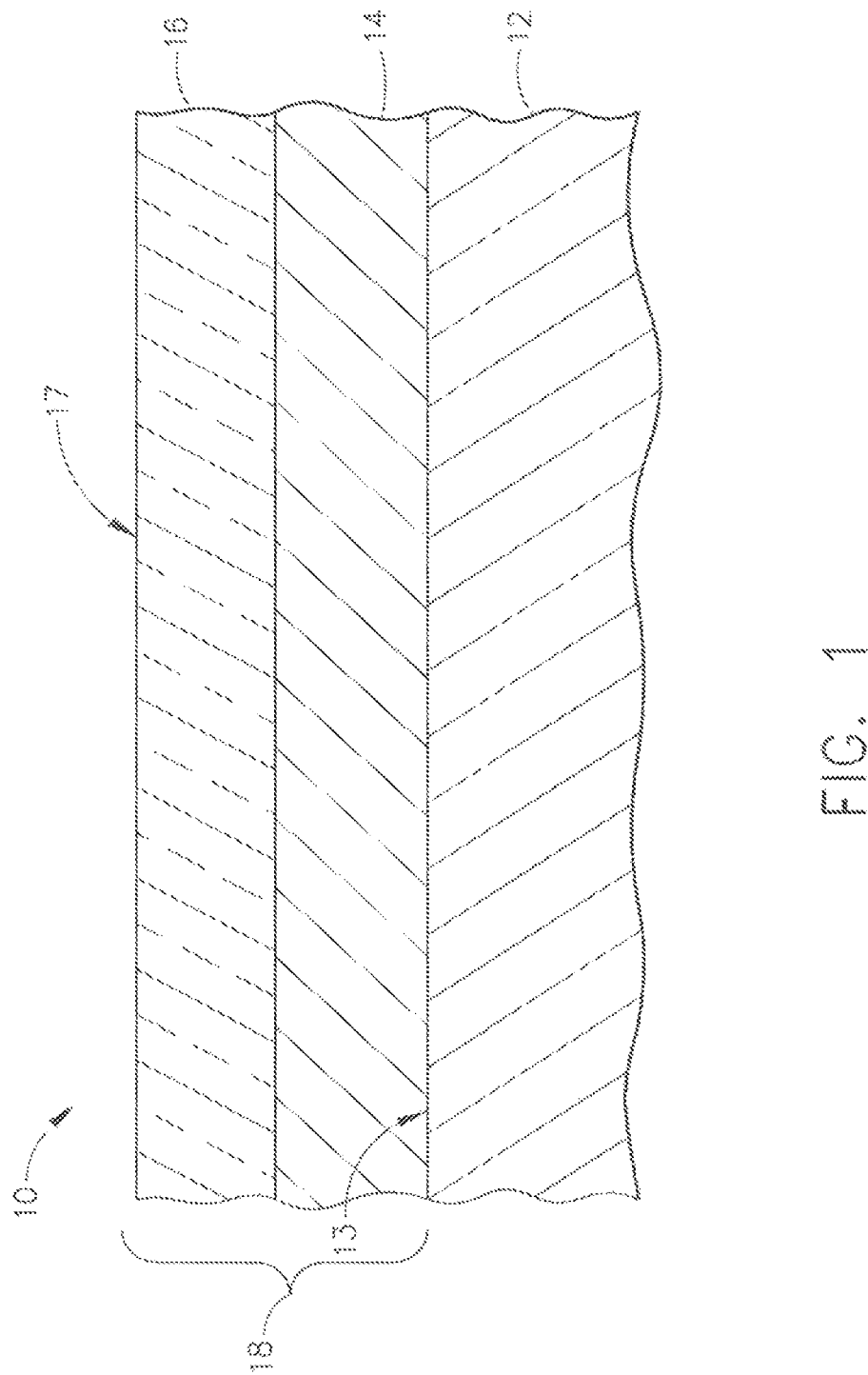
FIG. 1 is a schematic cross sectional view of an exemplary coated substrate in accordance with one embodiment disclosed herein.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

Substrates are generally provided that have a coating comprising a compound of the formula: $Ln_2ABO_8$, where Ln comprises a rare earth element or a mixture of rare earth elements; A comprises Si, Ti, Ge, Sn, Ce (e.g., $Ce^{4+}$), Hf, Zr, or a combination thereof; and B comprises Mo, W, or a combination thereof. The compound has, in one embodiment, a zircon crystal structure within the coating. For example, the coating can have a single phase structure (e.g., a zircon crystal structure or a scheelite crystal structure) with less than about 10% by volume of a secondary crystal phase.

"Ln" refers to the rare earth elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or mixtures thereof. In particular embodiments, Ln is selected from the group consisting of neodymium, gadolinium, erbium, yttrium, and mixtures thereof.

In one embodiment, B comprises Mo. In certain embodiments, B comprises a combination of Mo and W. For instance, the compound can have the formula $Ln_2AMo_xW_{1-x}O_8$, where 0≤x≤about 0.5 (e.g., about 0.1≤x≤about 0.5).

While compounds of the formula $Ln_2ABO_8$ exhibit high stability in high temperature steam such as found in a hot gas path of a gas turbine, the most unstable element in the compound is on the B site (i.e., Mo and/or W). However, even if some Mo or W volatilizes, the result may be a $Ln_2AO_5$ compound on the surface that is also very resistant to high temperature steam recession. Thus, in one embodiment, the material at the Ln site can be chosen to such that a mixture of oxyapetite phase and $Ln_2AO_5$ phase forms on the surface of the coating. This reaction seals the material from deep penetration of the molten aluminosilicate into the EBC system. Also, the presence of the $Ln_2AO_5$ component in the $Ln_2ABO_8$ molten aluminosilicate reaction layer improves adhesion since the $Ln_2AO_5$ has a lower thermal expansion than the oxyapatite; resulting in a net thermal expansion that is closer to the thermal expansion of the substrate. Furthermore, both the $Ln_2AO_5$ and oxyapatite phases that result from reaction between molten aluminosilicate and a layer including $Ln_2ABO_8$ are resistant to high temperature steam recession.

While A can be any of Si, Ti, Ge, Sn, Ce, Hf, Zr, or a combination thereof, in one particular embodiment, A includes Si, either alone or in combination with Ti, Sn, Ce, Ge, Hf, and/or Zr. For example, the compound can have the formula: $Ln_2Si_yA_{1-y}Mo_xW_{1-x}O_8$, where 0≤x≤about 0.5; 0≤y≤about 0.5; and A is Ti, Ge, Sn, Ce, Hf, Zr, or a combination thereof. In certain embodiments, A can be Hf and/or Zr, either alone or in combination with Ti, Sn, Ce, Ge, and/or Si, since the presence of Hf and/or Zr has a significant effect on raising the melting point of the compound.

The selection of the components in the compound for use in the coating can generally be selected to ensure the single phase crystal structure (e.g., zircon structure) and to match closely the coefficient of thermal expansion ("CTE") of the substrate. CTE matching (or a near match) can enable the formation and operation of a dense, crack free coating layer on the substrate's surface to ensure that high temperature water vapor does not penetrate to the underlying substrate. For example, if the substrate is a CMC that includes silicon carbide, then a coating that includes the compound having the formula: $Y_2SiMoO_8$ can be particularly suitable due to the close CTEs of SiC and $Y_2SiMoO_8$. Thus, an embodiment of the compound can have the formula: $Ln_2Si_yA_{1-y}Mo_xW_{1-x}O_8$, where $0 \leq x \leq$ about 0.5; $0 \leq y \leq$ about 0.5; and A is Ti, Ge, Sn, Ce, Hf, Zr, or a combination thereof, especially when the compound has a zircon crystal structure.

Many of the other compounds of the $Ln_2ABO_8$ have a scheelite structure that may have a thermal expansion nearly equivalent to a SiC CMC or a higher thermal expansion than a SiC CMC. If higher than a SiC, however, vertically cracked layers comprised of the scheelite formed of these materials can still offer some resistance to high T steam, particularly if there are additional layers underneath that are crack free to act as a hermetic layer. In addition, the compounds of the formula $Ln_2ABO_8$ (either with zircon or scheelite structure) offer protection from molten aluminosilicates, particularly those comprising dirt or sand. That is, the coating is resistant to molten aluminosilicates themselves, such that the coating layer remains hermetic despite reaction with molten aluminosilicates.

Without wishing to be bound by any particular theory, it is believed that the CTE of the $Ln_2ABO_8$ compound can be controlled by altering the size of the element(s) represented by "A" in the formula. That is, through intentional use of Si, Ti, Ge, Sn, Ce, Hf, Zr, or a combination thereof in the $Ln_2ABO_8$ compound, the CTE of the resulting coating can be controlled. More particularly, it is believed that increasing the ionic size of the element(s) at position represented by "A" in the formula can lead to an increased CTE in the coating. This feature is discussed in greater detail below in the Example section.

Such a coating can be included as a stand-along coating layer (with or without a bond layer present) on a substrate, within any layer of an EBC system on a substrate, and/or as an abradable layer on an EBC system.

Referring to FIG. 1, for example, an exemplary coated substrate 10 is shown that includes a substrate 12, a bond coat layer 14 on the surface 13 of the substrate 12, and a barrier coating 16 on the bond coat layer 14. Collectively, the bond coat layer 14 and the barrier coating 16 form the EBC system 18 of the coated substrate 10. In this embodiment, the barrier coating 16 includes any compound of having formula $Ln_2ABO_8$ as discussed in greater detail above.

I. CMC Substrates

The substrate includes, in one embodiment, a ceramic matrix composite (CMC) material. As used herein, "CMCs" refers to silicon-containing, or oxide-oxide, matrix and reinforcing materials. Some examples of CMCs acceptable for use herein can include, but are not limited to, materials having a matrix and reinforcing fibers comprising non-oxide silicon-based materials such as silicon carbide, silicon nitride, silicon oxycarbides, silicon oxynitrides, and mixtures thereof. Examples include, but are not limited to, CMCs with silicon carbide matrix and silicon carbide fiber; silicon nitride matrix and silicon carbide fiber; and silicon carbide/silicon nitride matrix mixture and silicon carbide fiber. Furthermore, CMCs can have a matrix and reinforcing fibers comprised of oxide ceramics. These oxide-oxide composites are described below.

Specifically, the oxide-oxide CMCs may be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

As used herein, "monolithic ceramics" refers to materials comprising only silicon carbide, only silicon nitride, only alumina, only silica, or only mullite. Herein, CMCs and monolithic ceramics are collectively referred to as "ceramics."

The coating can serve as an environmental barrier coating ("EBC") on such CMCs. For example, the EBCs herein may be suitable for use on ceramic substrate components found in high temperature environments, such as those present in gas turbine engines, for example, combustor components, turbine blades, shrouds, nozzles, heat shields, and vanes.

As shown in FIG. 1, the barrier coating 16 that includes the compound of $Ln_2ABO_8$ can be used as a single EBC layer (i.e., without any other ECB layers present) on the bond coat layer 14, such as silicon metal or silicon metal layer with silicon oxide thermally grown oxide (TGO). This single EBC layer can be realized due to the ability of the compound of $Ln_2ABO_8$ to remain dense and crack free during high temperature applications due to the CTE near matching of the barrier coating 16 with the substrate 12. The barrier coating 16 is also CMAS resistant and recession resistant, since it readily forms surface $Ln_2AO_5$ if the B site volatilizes.

Instead of allowing the $Ln_2AO_5$ to form in situ, in another embodiment, it can be deliberately deposited on top of the $Ln_2ABO_8$ as an outer layer 24.

Figure 2:
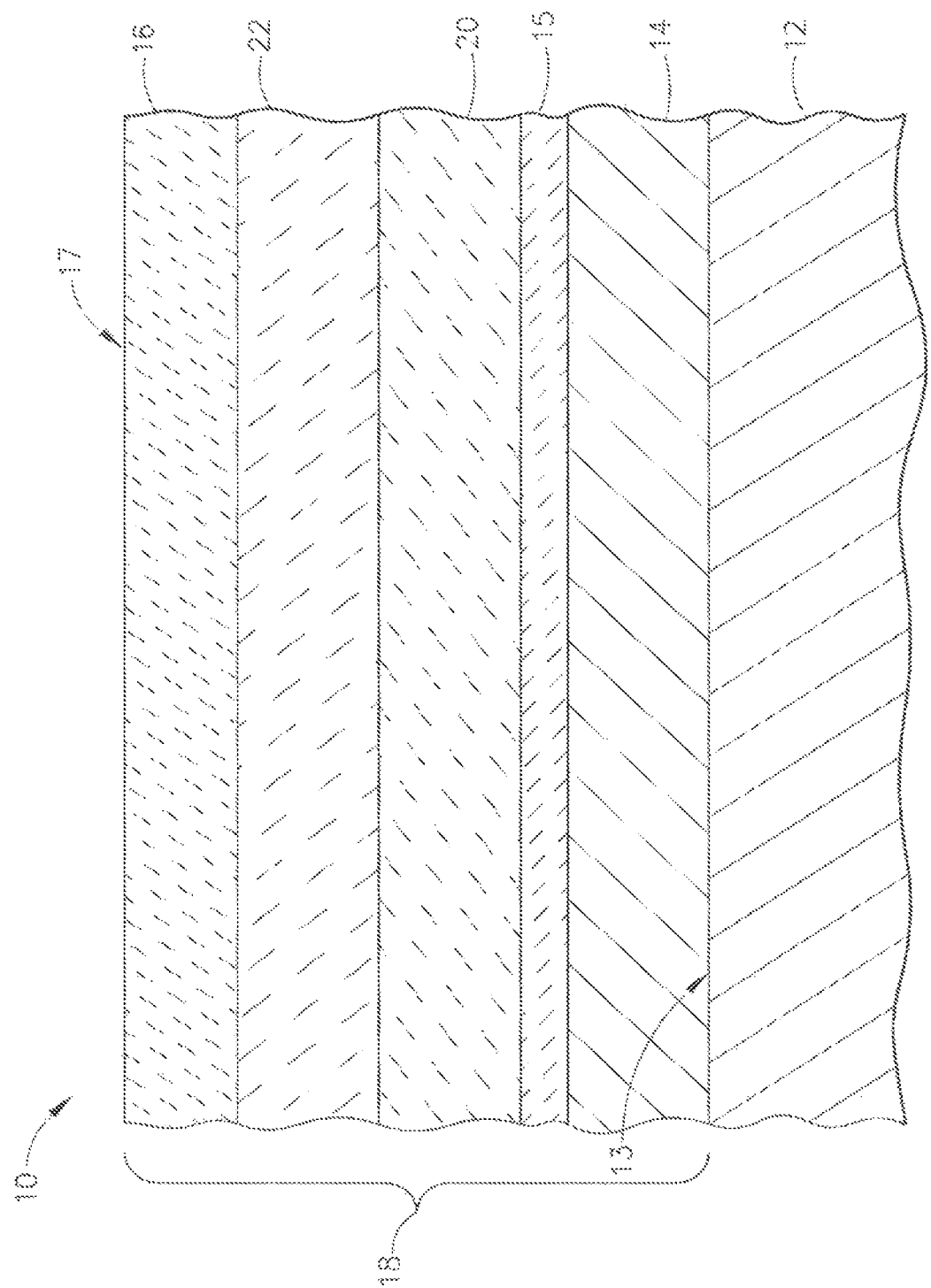
FIG. 2 is a schematic cross sectional view of another exemplary coated substrate in accordance with one embodiment disclosed herein.
Figure 3:
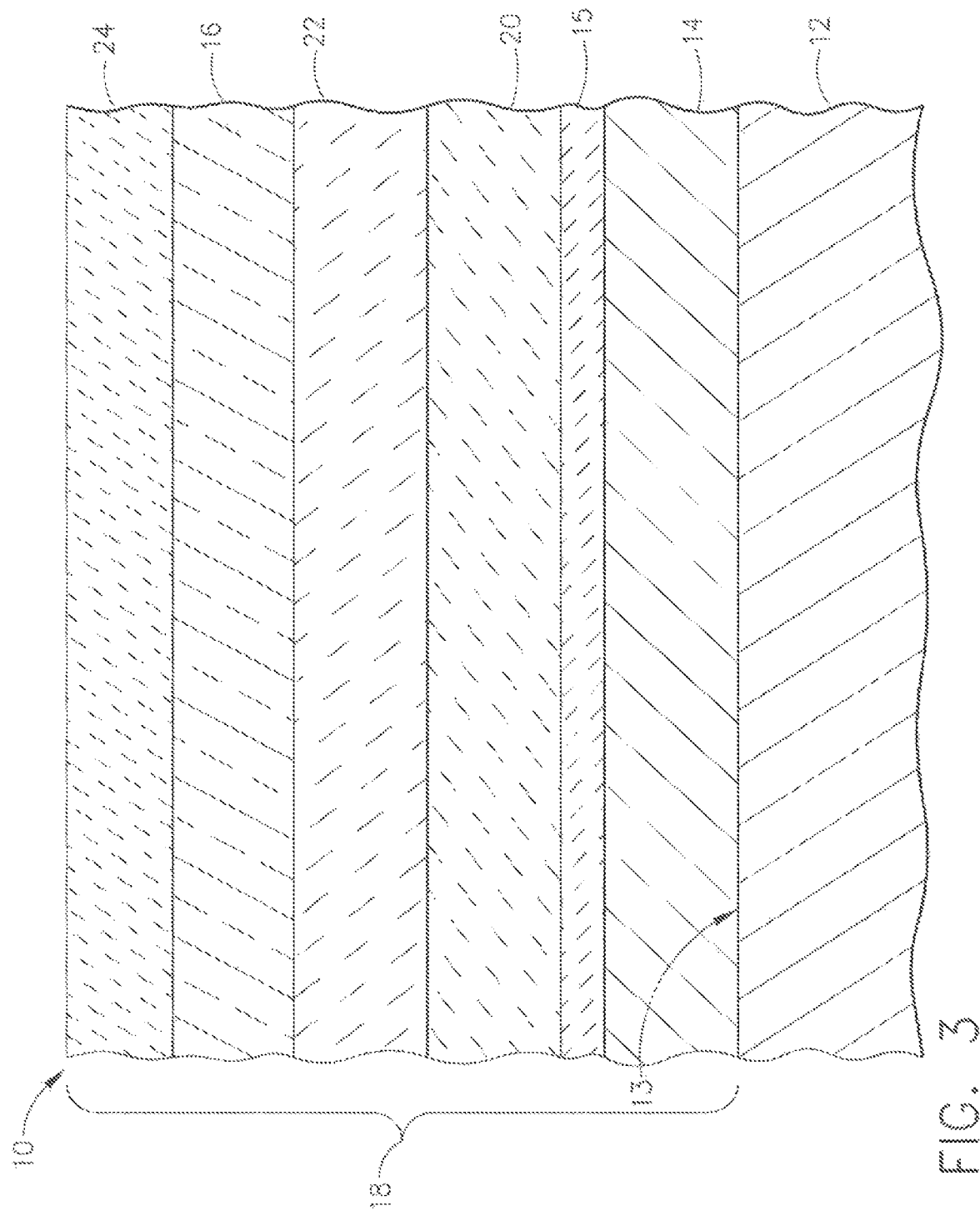
FIG. 3 is a schematic cross sectional view of yet another exemplary coated substrate in accordance with one embodiment disclosed herein.

Alternatively, the barrier coating 16 can be included as a layer within any EBC system on a CMC substrate. The embodiments shown in FIGS. 2 and 3 depict exemplary EBC systems 18 that include the barrier coating 16 therein. For example, an optional silica layer 15 may be present on the bond coat layer 14 and positioned between the bond coat layer 14 and the barrier coating 16. The silica layer 15 may be applied to the bond coat layer 14, or alternately, may be formed naturally or intentionally on the bond coat layer 14.

A hermetic layer 20 (i.e., a layer that) may optionally be present in the EBC system 18, such as shown in the exemplary coated substrates 10 of FIGS. 2 and 3. If present, the hermetic layer 20 may include rare earth disilicates, mullite, barium strontium aluminosilicate (BSAS) and/or combinations thereof. Such a hermetic layer 20 prevents penetration of high temperature water vapor but may have limited to no CMAS mitigation capability.

Additionally or alternatively, an optional transition layer 22 may be present in the EBC system 18, as shown in FIGS. 2 and 3. The transition layer may comprise rare earth elements (Ln), rare earth oxides, zirconia, hafnia, hafnia partially or fully stabilized with alkaline earth or rare earth elements, zirconia partially or fully stabilized with alkaline earth or rare earth elements, rare earth hafnates, rare earth zirconates, rare earth monosilicates, alumina, cordierite, and/or combinations thereof. Such a transition layer 22 prevents reaction between adjacent layers in an EBC system stack, may provide limited to no protection against penetration of high temperature water vapor, and may or may not have CMAS mitigation capability.

In such embodiments, the barrier coating 16 including a compound of the formula $Ln_2ABO_8$ (either zircon or scheelte) can also offer superior resistance against CMAS if it is deposited on top of another EBC layer, such as the hermetic layer 20 (e.g., a hermetic layer 20 including $Yb_2Si_2O_7$), transition layer 22 (e.g. $HfO_2$), or combinations thereof.

In the exemplary coated substrate 10 of FIG. 2, the barrier coating 16 defines an external surface 17 of the EBC system similar to the embodiment shown in FIG. 1. In such an embodiment, the exposed barrier coating 16 can additionally serve as an abradable layer on the EBC system 18 and the CMC substrate 12.

However, in the embodiment shown in FIG. 3, an optional outer coat layer 24 and optional abradable layer 26 can be present on the barrier coating 16. Such an outer coat layer 24 can be $Ln_2AO_5$, and the abradable layer 26, can be BSAS or rare earth disilicate (e.g. ytterbium disilicate or $Yb_2Si_2O_7$) where the abradable layer is the outermost layer.

Figure 4:
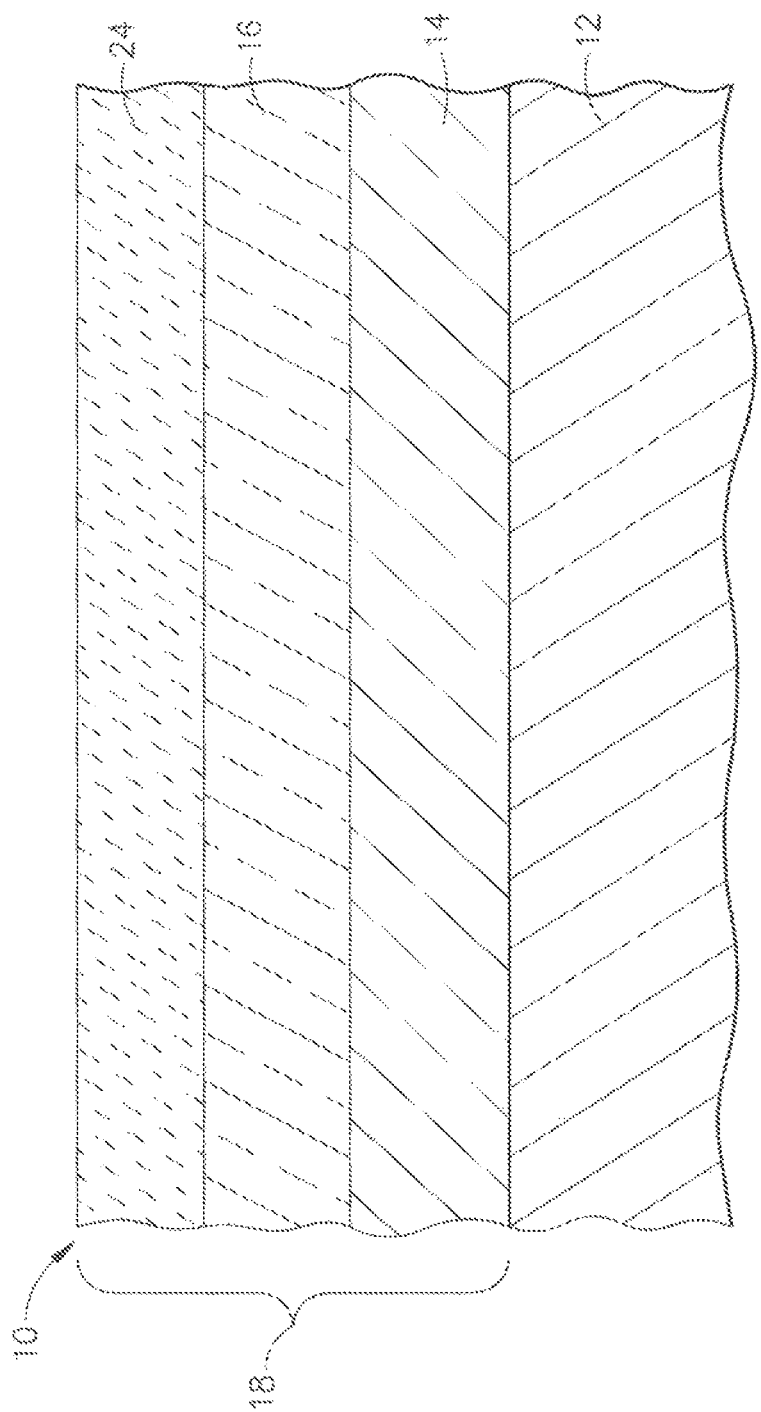
FIG. 4 is a schematic cross sectional view of still another exemplary coated substrate in accordance with one embodiment disclosed herein.

For example, the particular embodiment shown in FIG. 4 has a EBC system 18 that includes a bond coat layer 14 (e.g., of silicon) on the substrate 12 (e.g., a SiC CMC substrate), a barrier coating 16 (e.g., $Ln_2Si_yA_{1-y}Mo_xW_{1-x}O_8$ as discussed above), and an outer coat layer 24 (e.g., $Ln_2SiO_5$ as discussed above, such as $Y_2SiO_5$). Other layers could be included in this exemplary EBC system, as discussed herein.

As stated, the coated substrate can be utilized as a turbine component for a gas turbine. In particular, the turbine component can be a CMC component positioned within a hot gas flow path of the gas turbine such that the coating forms an environmental barrier coating on the component to protect the component within the gas turbine when exposed to the hot gas flow path.

II. Metal Substrates

In other embodiments, the substrate includes a superalloy material, such as a nickel-based superalloy, a cobalt-based superalloy, a titanium-based superalloy, or an iron-based superalloy. The coating, which includes the compound of $Ln_2ABO_8$ as discussed above, can serve as a thermal barrier coating ("TBC") on such superalloys. For example, the TBCs herein may be suitable for use on superalloy substrate components found in high temperature environments, such as those present in gas turbine engines, for example, combustor components, turbine blades, shrouds, nozzles, heat shields, and vanes.

Referring again to FIG. 1, the barrier coating 16 that includes the compound of $Ln_2ABO_8$ can be used as a single TBC layer (i.e., without any other TBC layers present) on the superalloy material. The barrier coating 16 is also CMAS resistant and recession resistant, since it readily forms surface $Ln_2AO_5$ if the B site volatilizes. Alternatively, a bond coat layer 14 can be present between the metal substrate and barrier coating 16. The bond coat can include materials that form an aluminum oxide thermally grown oxide (TGO) such as platinum and other noble metal aluminides (e.g., an aluminide including ruthenium, rhodium, palladium, silver, osmium, iridium, platinum, gold, or mixtures thereof), nickel aluminide, and MCrAlY's (where M is nickel, cobalt, iron, or combinations thereof), or can include materials that form a silicon oxide TGO such as metal silicides (e.g. molybdenum silicide, iron silicide, etc.).

Alternatively, the barrier coating 16 can be included as a layer within any TBC system on an alloy substrate. Referring to the embodiments shown in FIGS. 2 and 3, an optional oxide layer 15 (e.g., silicon oxide, aluminum oxide, and/or zinc oxide, optionally with a transition metal present as a stabilizer, such as yttria) may be present on the bond coat layer 14 and positioned between the bond coat layer 14 and the barrier coating 16. The oxide layer 15 may be applied to the bond coat layer 14, or alternately, may be formed naturally or intentionally on the bond coat layer 14.

Additionally or alternatively, an optional TBC layer 22 and/or optional TBC layer 24 may be present in the TBC system 18, as shown in FIGS. 2 and 3. The optional TBC layer may comprise rare earth elements (Ln), rare earth oxides, rare earth gallates, rare earth aluminates, rare earth iron oxides, hafnia partially or fully stabilized with alkaline earth or rare earth elements, zirconia partially or fully stabilized with alkaline earth or rare earth elements, rare earth hafnates, rare earth zirconates, rare earth monosilicates, and/or combinations thereof. Such optional TBC layers may be positional beneath (optional TBC layer 22), at an outer location in relation to layer 16 (optional TBC layer 24), or as a combination.

In such an embodiment, the barrier coating 16 including a compound of the formula $Ln_2ABO_8$ (either zircon or scheelite) can also offer superior resistance against CMAS if it is deposited on top of an optional TBC layer 22 (e.g., zirconia partially or fully stabilized with rare earth elements). In such case, the optional TBC layer 22 may also prevent reaction between barrier coating 16 and the alloy substrate 12, bond coat 14, or bond coat TGO 15.

In the exemplary coated substrate 10 of FIG. 2, the barrier coating 16 defines an external surface 17 of the TBC system similar to the embodiment shown in FIG. 1. In such an embodiment, the exposed barrier coating 16 can additionally serve as an abradable layer on the TBC system 18 and the alloy substrate 12.

Figure 5:
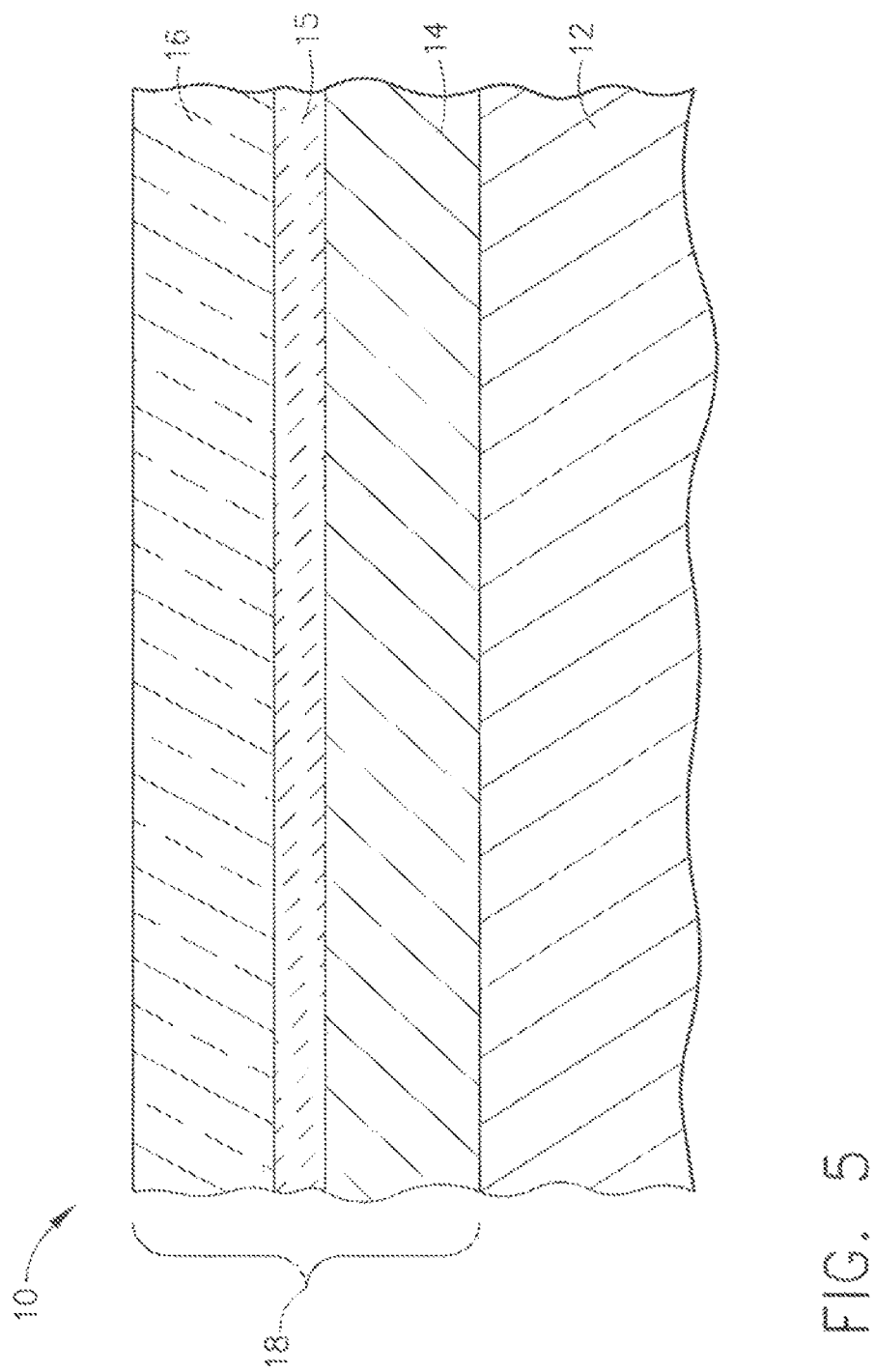
FIG. 5 is a schematic cross sectional view of still another exemplary coated substrate in accordance with one embodiment disclosed herein.

For example, the particular embodiment shown in FIG. 5 has a TBC system 18 that includes a bond coat layer 14 (e.g., of Pt aluminide) on the substrate 12 (e.g., a superalloy substrate), an oxide layer 15 (e.g., comprising yttria stabilized $ZrO_2$) on the bond coat layer 14, and a barrier coating 16 (e.g., $Ln_2ABO_8$ as discussed above). Other layers could be included in this exemplary TBC system, as discussed herein.

However, in the embodiment shown in FIG. 3, an optional TBC layer 24 and optional abradable layer 26 can be present on the barrier coating 16. The optional abradable layer 26 may comprise $Ln_2ABO_8$, any of the optional TBC layer 24 materials described above, or combinations thereof.

As stated, the coated substrate can be utilized as a turbine component for a gas turbine. In particular, the turbine component can be a superalloy component positioned within a hot gas flow path of the gas turbine such that the coating forms a thermal barrier coating on the component to protect the component within the gas turbine when exposed to the hot gas flow path.

III. Abradable Layer

The compound of the formula: $Ln_2ABO_8$, discussed above, can also be utilized as an abradable coating forming the external, exposed surface of any type of TBC or EBC system on a substrate. The abradable coating can be formed from a single layer or from multiple layers. For example, embodiments of the abradable layer 26 may include a continuous dense layer (e.g., less than about 15% porosity), a continuous porous layer (e.g., greater than about 15% porosity), and/or a pattern of dense (e.g., less than about 15% porosity) abradable ridges.

Figure 6:
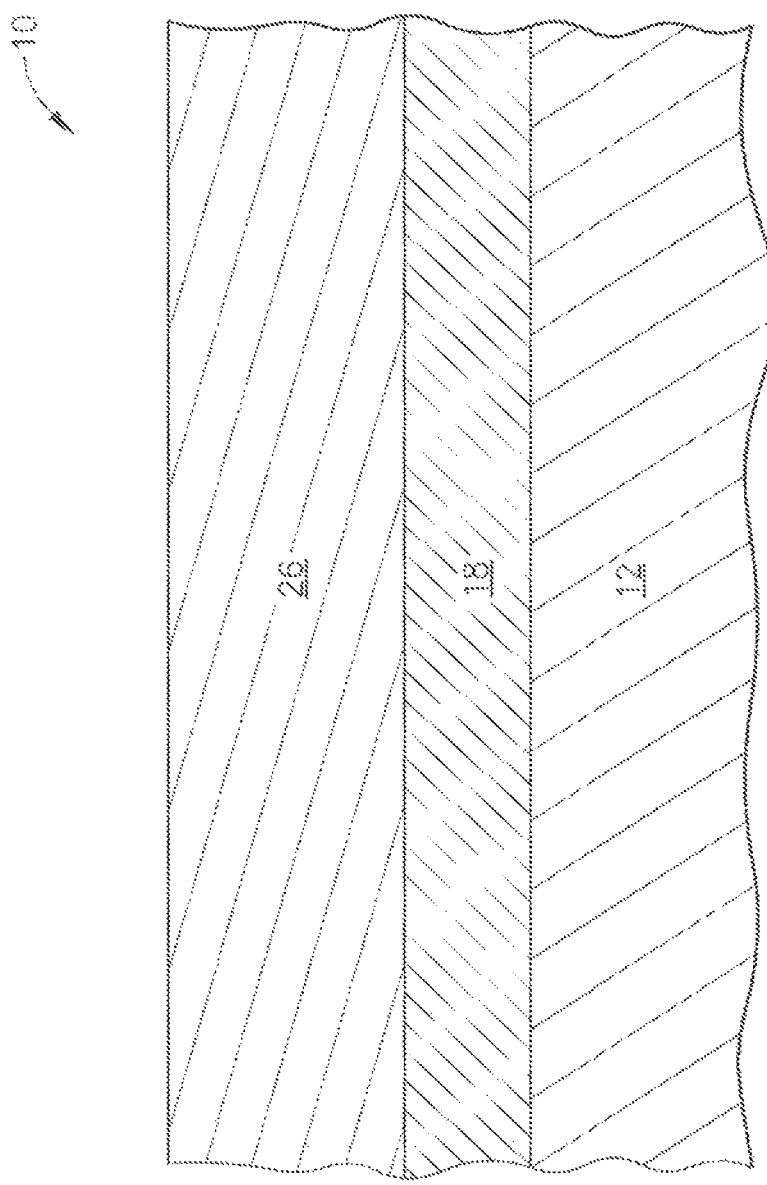
FIG. 6 is a schematic cross sectional view of still another exemplary coated substrate in accordance with one embodiment disclosed herein.

Referring to FIG. 6, an exemplary embodiment is shown having a EBC or TBC system 18 on a substrate 12, and an abradable coating 26 on the EBC or TBC system 18. Here, the abradable coating 26 defines an external surface that is configured to be abraded upon contact with another component, effectively protecting the underlying EBC or TBC system 18. The use of the compound of the formula: $Ln_2ABO_8$, discussed above, can further add barrier properties to the EBC or TBC system 18 as well as tailoring the CTE to the particular EBC or TBC system 18 and/or substrate 12.

For instance, if the substrate 12 is a SiC CMC, then the EBC system 18 can include a bond coat layer (e.g., of silicon), a hermetic layer (e.g., including a rare earth disilicate), a transition layer (e.g., $Ln_2SiO_5$ as discussed above, such as $Y_2SiO_5$), and the abradable layer 26 comprising compound of the formula: $Ln_2ABO_8$. A EBC layer (e.g., comprising BSAS) and/or an additional hermetic layer (e.g., comprising a rare earth disilicate) may also be present in the EBC system 18, such as between the bond coat layer and the hermetic layer.

EXAMPLES

Figure 7:
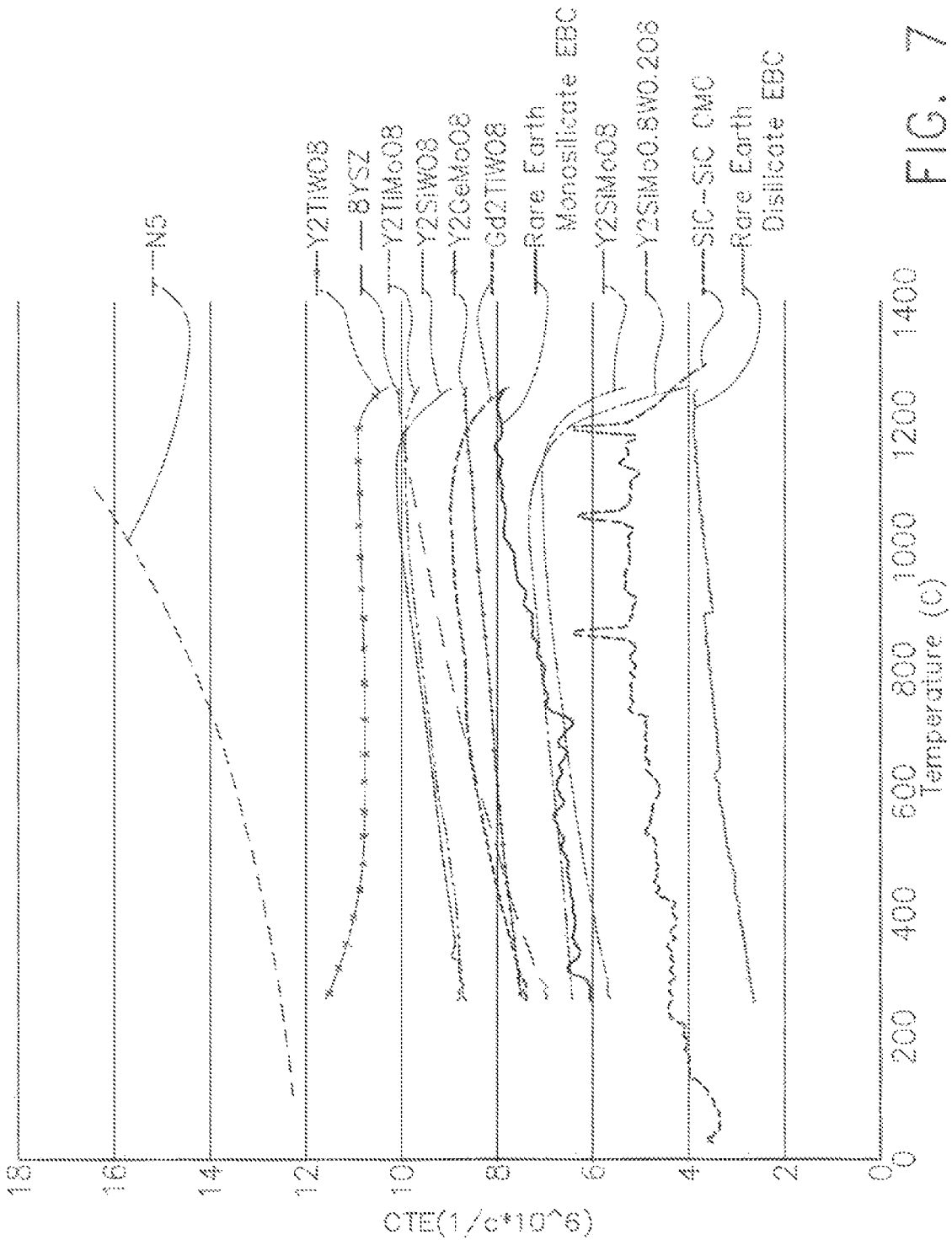
FIG. 7 shows the CTE curve of various exemplary $Ln_2ABO_8$ compounds compared to a superalloy material (N5).

It is believed that increasing the ionic size of the element(s) at position represented by "A" in the formula can lead to an increased CTE in the coating, without wishing to be bound by any particular theory. FIG. 7 shows the CTE of various exemplary $Ln_2ABO_8$ compounds compared to a superalloy material (commercially available under the trade designation N5 from General Electric Company); a CMC material (SiC—SiC CMC); a known rare earth monosilicate EBC material; and another known rare earth monosilicate EBC material; and a known TBC layer (8YSZ). As shown, the use of larger element(s) at position represented by "A" in the formula generally led to an increased CTE in the $Ln_2ABO_8$ compound. Likewise, the use of the larger, W, led to an increased CTE in the $Ln_2ABO_8$ compound on the "B" position as compared to Mo. The inverse is true for the Ln site, where the smaller Ln elements led to an increased CTE in the $Ln_2ABO_8$ compound. By adjusting the Ln, A, and B elements the CTE of the material can be tailored towards that of a coating for SiC CMC's (with lower CTE) or for nickel-based superalloys (with higher CTE).

While the invention has been described in terms of one or more particular embodiments, it is apparent that other forms could be adopted by one skilled in the art. It is to be understood that the use of "comprising" in conjunction with the coating compositions described herein specifically discloses and includes the embodiments wherein the coating compositions "consist essentially of" the named components (i.e., contain the named components and no other components that significantly adversely affect the basic and novel features disclosed), and embodiments wherein the coating compositions "consist of" the named components (i.e., contain only the named components except for contaminants which are naturally and inevitably present in each of the named components).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A coated component, comprising:
   a metal substrate;
   a barrier coating comprising a compound having the formula:

$$Ln_2AMo_xW_{1-x}O_8$$

where Ln comprises scandium, yttrium, lanthanum, cerium, praseodymium, neodymium, promethium, samarium, europium, gadolinium, terbium, dysprosium, holmium, erbium, thulium, ytterbium, lutetium, or mixtures thereof;
   A comprises Si, Ti, Ge, Sn, Ce, Hf, Zr, or a combination thereof; and
   $0<x\leq0.5$.

2. The coated substrate as in claim 1, wherein Ln is selected from the group consisting of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), and mixtures thereof.

3. The coated substrate as in claim 1, wherein Ln comprises yttrium.

4. The coated substrate as in claim 1, wherein A comprises Si.

5. The coated substrate as in claim 1, wherein the compound has the formula:

$$Ln_2Si_yA_{1-y}Mo_xW_{1-x}O_8$$

where
   $0<y\leq0.5$; and
   A is Ti, Ge, Sn, Ce, Hf, Zr, or a combination thereof.

6. The coated substrate as in claim 1, wherein A comprises Hf and/or Zr.

7. The coated substrate as in claim 1, wherein the compound comprises a zircon crystal structure or a scheelite structure.

8. The coated substrate as in claim 1, wherein the metal substrate comprises a nickel-based superalloy, a cobalt-based superalloy, a titanium-based superalloy, or an iron-based superalloy, and wherein the barrier coating defines an external surface of a multi-layer thermal barrier coating system formed on the metal substrate.

9. The coated substrate as in claim 8, wherein the multi-layer thermal barrier coating system includes an aluminide or silicide bond coat layer on the metal substrate, an oxide layer, and the barrier coating as the outermost layer defining the external surface.

10. The coated substrate as in claim 1, further comprising an outer coat layer on the barrier coating, and wherein the outer coat layer comprises $Ln_2SiO_5$, where Ln is scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or mixtures thereof.

11. The coated substrate as in claim 1, wherein the coated substrate is a component of a gas turbine engine with the barrier coating facing a hot gas stream within the gas turbine engine.

12. A gas turbine engine defining a hot gas stream, the gas turbine engine comprising the coated substrate of claim 1, wherein the barrier coating faces the hot gas stream within the gas turbine engine.

13. A method of forming a coated substrate, the method comprising:

applying a barrier coating over a substrate; wherein the barrier coating comprises a compound having the formula:

$$Ln_2AMo_xW_{1-x}O_8$$

where Ln comprises scandium, yttrium, lanthanum, cerium, praseodymium, neodymium, promethium, samarium, europium, gadolinium, terbium, dysprosium, holmium, erbium, thulium, ytterbium, lutetium, or mixtures thereof;

A comprises Si, Ti, Ge, Sn, Ce, Hf, Zr, or a combination thereof; and $0 < x \leq 0.5$.

14. The method of claim 13, wherein the barrier coating is applied to form the external exposed surface of the coated substrate.

15. The method of claim 14, wherein the barrier coating is applied as a pattern of dense abradable ridges.

* * * * *